(12) United States Patent
Brint

(10) Patent No.: US 7,536,823 B2
(45) Date of Patent: *May 26, 2009

(54) FLYING BIRD DECOY AND METHOD

(76) Inventor: George W. Brint, 3760 Forest Hill Rd., Bolivar, TN (US) 38008

( * ) Notice: Subject to any disclaimer, the term of this patent is extended or adjusted under 35 U.S.C. 154(b) by 0 days.

This patent is subject to a terminal disclaimer.

(21) Appl. No.: 11/893,505

(22) Filed: Aug. 16, 2007

(65) Prior Publication Data

US 2008/0092427 A1      Apr. 24, 2008

Related U.S. Application Data

(60) Provisional application No. 60/852,294, filed on Oct. 18, 2006.

(51) Int. Cl.
*A01M 31/06*       (2006.01)
(52) U.S. Cl. ............... 43/2; 43/3; 40/417; 446/30; 472/10
(58) Field of Classification Search ......... 43/2, 43/3; 40/414, 417, 429; 446/30, 228, 229; 472/7, 8, 10
See application file for complete search history.

(56) References Cited

U.S. PATENT DOCUMENTS

| 278,461 | A | * | 5/1883 | Screven | 43/2 |
| 942,103 | A | * | 12/1909 | Rigney | 43/2 |
| 1,083,882 | A | * | 1/1914 | Hindmarsh | 43/3 |
| 1,201,839 | A | * | 10/1916 | McCoole | 472/27 |
| 1,376,282 | A | * | 4/1921 | Kauffman | 43/2 |
| 1,385,634 | A | * | 7/1921 | Marshall | 446/228 |
| 1,511,044 | A | * | 10/1924 | Adams | 40/417 |
| 1,593,085 | A | * | 7/1926 | Lang | 40/417 |
| 1,652,775 | A | * | 12/1927 | Funk et al. | 40/417 |

(Continued)

FOREIGN PATENT DOCUMENTS

| DE | 226674 | 10/1910 | 43/3 |

(Continued)

*Primary Examiner*—Darren W Ark
(74) *Attorney, Agent, or Firm*—John M. Harrison

(57) ABSTRACT

A flying bird decoy for attracting wildlife wherein flying bird decoys may be supported on each end of one or more rotatable rods or arms, with wings that selectively fold and flap up and down in life-like, actual flying, landing and take-off movements. The bird decoys simulate foraging, predatory or waterfowl birds and in one embodiment a pair of the bird decoys are mounted on the ends of a rod or arm(s) rotatably mounted on a pole or stake support, using throat mounts. In another embodiment the bird decoys are secured to the ends of the arm(s) at the head without the use of throat mounts, for flying in a circle on the arm(s) to attract the wildlife. In a further embodiment one or both of the bird decoys are configured to simulate one of the above bird groups and fly to generate rotation of the arm(s), with one wing folded and the other flapping to simulate injury or distress. A method for attracting wildlife using flying bird decoys which simulate dove, quail, crows, hawks, ducks, geese or the like, and includes the steps of mounting the bird decoys on a rotatable arm or arms carried by a pole or stake support and causing one or both of the wings to flap, thus causing the bird decoys to fly or vibrate in a circle around the support.

14 Claims, 4 Drawing Sheets

U.S. PATENT DOCUMENTS

| | | | | |
|---|---|---|---|---|
| 1,666,543 | A * | 4/1928 | Vincent | 40/417 |
| 1,722,922 | A * | 7/1929 | Johnson | 472/10 |
| 1,738,846 | A * | 12/1929 | Sancioni | 40/417 |
| 1,746,640 | A * | 2/1930 | Emoff | 43/3 |
| 1,748,421 | A * | 2/1930 | Leach | 446/30 |
| 1,769,414 | A * | 7/1930 | Burris et al. | 40/214 |
| 1,813,277 | A * | 7/1931 | Churus | 446/325 |
| 1,814,314 | A * | 7/1931 | Kane et al. | 40/417 |
| 1,827,775 | A * | 10/1931 | Berger | 446/229 |
| 2,095,871 | A * | 10/1937 | Hite | 446/325 |
| 2,222,648 | A * | 11/1940 | Biller | 446/30 |
| 2,246,132 | A * | 6/1941 | Gordon | 40/417 |
| 2,272,597 | A * | 2/1942 | Butler | 472/7 |
| 2,292,705 | A * | 8/1942 | Lohse | 446/30 |
| 2,357,900 | A * | 9/1944 | Lenhardt | 446/228 |
| 2,532,571 | A * | 12/1950 | Reeves | 446/246 |
| 2,545,801 | A * | 3/1951 | Wrazen | 40/417 |
| 2,546,189 | A * | 3/1951 | Keep et al. | 43/3 |
| 2,547,286 | A * | 4/1951 | Sabin | 43/3 |
| 2,554,516 | A * | 5/1951 | Anthony | 446/325 |
| 2,611,214 | A * | 9/1952 | Schur | 446/325 |
| 2,611,997 | A * | 9/1952 | Solloway et al. | 446/325 |
| 2,613,931 | A * | 10/1952 | Singer | 472/7 |
| 2,616,200 | A * | 11/1952 | Milam | 43/3 |
| 2,624,144 | A * | 1/1953 | Beverman | 43/3 |
| 2,638,705 | A * | 5/1953 | Petrasy | 40/417 |
| 2,663,108 | A * | 12/1953 | Dixon et al. | 43/3 |
| 2,680,619 | A * | 6/1954 | Reiter | 273/351 |
| 2,689,732 | A * | 9/1954 | Madaloni | 472/7 |
| 2,704,908 | A * | 3/1955 | Lamkin | 40/417 |
| 2,709,079 | A * | 5/1955 | Bubb et al. | 446/486 |
| 2,729,022 | A * | 1/1956 | Polk | 40/417 |
| 2,747,316 | A * | 5/1956 | Benedetto | 43/3 |
| 2,752,715 | A * | 7/1956 | Miller | 43/3 |
| 2,769,276 | A * | 11/1956 | Steiner | 472/7 |
| 2,791,427 | A * | 5/1957 | Johnson | 472/7 |
| 2,968,482 | A * | 1/1961 | Gjertsen | 446/30 |
| 3,136,544 | A * | 6/1964 | Strayer | 446/30 |
| 3,163,418 | A * | 12/1964 | Myers | 40/538 |
| 3,176,431 | A * | 4/1965 | Richardson et al. | 446/343 |
| 3,252,242 | A * | 5/1966 | Zalkind | 446/325 |
| 3,290,817 | A * | 12/1966 | Kravath | 446/227 |
| 3,419,995 | A * | 1/1969 | Siegler | 40/417 |
| 3,452,473 | A * | 7/1969 | Convertine | 446/353 |
| 3,476,386 | A * | 11/1969 | Bart | 446/30 |
| 3,557,436 | A * | 1/1971 | Hodes | 446/370 |
| 3,665,642 | A * | 5/1972 | Horner | 446/325 |
| 3,731,424 | A * | 5/1973 | Meyer | 472/10 |
| 3,736,688 | A * | 6/1973 | Caccamo | 43/3 |
| 3,743,279 | A * | 7/1973 | Chang | 446/30 |
| 3,762,702 | A * | 10/1973 | Keele et al. | 472/10 |
| 3,810,624 | A * | 5/1974 | McNemar | 446/325 |
| 3,818,630 | A * | 6/1974 | May | 446/396 |
| 3,837,113 | A * | 9/1974 | Triska | 446/325 |
| 3,921,331 | A * | 11/1975 | Schatz | 446/325 |
| 4,135,711 | A * | 1/1979 | Holt | 472/10 |
| 4,339,887 | A * | 7/1982 | Streeter | 43/2 |
| 4,422,257 | A * | 12/1983 | McCrory | 43/3 |
| 4,432,158 | A * | 2/1984 | Nicholas | 446/325 |
| 4,614,505 | A * | 9/1986 | Schneider et al. | 446/372 |
| 4,650,701 | A * | 3/1987 | Jackson | 446/374 |
| 4,660,313 | A * | 4/1987 | Bauernfeind et al. | 43/3 |
| 4,689,913 | A * | 9/1987 | Brice | 43/3 |
| 4,729,748 | A * | 3/1988 | Van Ruymbeke | 446/376 |
| 4,817,937 | A * | 4/1989 | Ozeki | 472/10 |
| 4,896,448 | A * | 1/1990 | Jackson | 43/3 |
| 4,931,029 | A * | 6/1990 | Hwang | 446/396 |
| 4,949,486 | A * | 8/1990 | Belokin et al. | 40/417 |
| 4,965,953 | A * | 10/1990 | McKinney | 43/2 |
| 4,992,072 | A * | 2/1991 | Leigh | 446/486 |
| D315,371 | S * | 3/1991 | Van Risseghem et al. | D21/467 |
| 5,003,722 | A * | 4/1991 | Berkley et al. | 43/3 |
| 5,069,650 | A * | 12/1991 | Lehmann et al. | 446/476 |
| 5,100,360 | A * | 3/1992 | Entzel | 446/169 |
| 5,102,126 | A * | 4/1992 | Nguyen | 472/10 |
| 5,144,764 | A * | 9/1992 | Peterson | 43/3 |
| 5,146,702 | A * | 9/1992 | Belokin, Jr. | 40/414 |
| 5,163,861 | A * | 11/1992 | Van Ruymbeke | 446/461 |
| 5,221,225 | A * | 6/1993 | Newbold et al. | 446/297 |
| 5,322,036 | A * | 6/1994 | Merino | 446/325 |
| 5,682,702 | A * | 11/1997 | McKnight et al. | 43/3 |
| 5,720,644 | A * | 2/1998 | Ku | 446/351 |
| 5,832,649 | A * | 11/1998 | Kilgore | 43/2 |
| 5,956,880 | A * | 9/1999 | Sugimoto | 43/2 |
| 5,983,552 | A * | 11/1999 | Nelson | 43/2 |
| 6,038,812 | A * | 3/2000 | Belokin et al. | 40/414 |
| 6,070,356 | A * | 6/2000 | Brint et al. | 43/2 |
| 6,079,140 | A * | 6/2000 | Brock, IV | 43/3 |
| 6,092,323 | A * | 7/2000 | McBride et al. | 43/3 |
| 6,129,606 | A * | 10/2000 | Yuen | 446/325 |
| 6,273,779 | B1 * | 8/2001 | Boulaire | 446/325 |
| 6,336,286 | B1 * | 1/2002 | Liechty, II | 43/3 |
| 6,430,863 | B1 * | 8/2002 | Krag | 43/3 |
| 6,449,894 | B1 * | 9/2002 | Price et al. | 43/3 |
| 6,493,980 | B1 * | 12/2002 | Richardson et al. | 43/3 |
| 6,572,428 | B1 * | 6/2003 | Weiser et al. | 40/417 |
| 6,574,904 | B1 * | 6/2003 | Fencel et al. | 43/3 |
| 6,599,160 | B2 * | 7/2003 | Weiser et al. | 40/417 |
| 6,620,018 | B1 * | 9/2003 | Chao et al. | 446/30 |
| 6,625,919 | B1 * | 9/2003 | Davis et al. | 43/3 |
| 6,698,132 | B1 * | 3/2004 | Brint | 43/2 |
| 6,834,458 | B1 * | 12/2004 | Hand et al. | 43/3 |
| 6,845,586 | B1 * | 1/2005 | Brock, IV | 43/3 |
| 6,907,688 | B2 * | 6/2005 | Brint | 43/2 |
| 7,028,429 | B1 * | 4/2006 | Druliner | 43/3 |
| 7,043,865 | B1 * | 5/2006 | Crowe | 43/3 |
| 7,131,230 | B1 * | 11/2006 | Gilsdorf | 43/3 |
| 7,137,221 | B2 * | 11/2006 | Highby et al. | 43/2 |
| 7,434,347 | B1 * | 10/2008 | Powell | 43/3 |
| 2002/0162268 | A1 * | 11/2002 | Fulcher | 43/3 |
| 2003/0196367 | A1 * | 10/2003 | Powell | 43/3 |
| 2003/0208944 | A1 * | 11/2003 | Olson et al. | 43/3 |
| 2004/0237373 | A1 * | 12/2004 | Coleman | 43/3 |
| 2005/0150149 | A1 * | 7/2005 | Highby et al. | 43/3 |
| 2007/0039227 | A1 * | 2/2007 | Highby et al. | 43/2 |
| 2008/0163538 | A1 * | 7/2008 | Butz | 43/3 |

FOREIGN PATENT DOCUMENTS

| | | | |
|---|---|---|---|
| EP | 1279333 | 1/2003 | |
| FR | 848634 | 11/1939 | 43/3 |
| FR | 2646588 | 11/1990 | |
| FR | 2671694 A1 * | 7/1992 | |
| GB | 389522 | 3/1933 | 43/2 |
| GB | 406386 | 3/1934 | |
| GB | 611844 | 11/1948 | 43/2 |
| GB | 966386 | 8/1964 | 43/2 |
| IT | 262806 | 2/1929 | 43/2 |
| IT | 471206 | 8/1950 | |
| IT | 624517 | 9/1961 | |
| SE | 129808 | 8/1950 | |

* cited by examiner

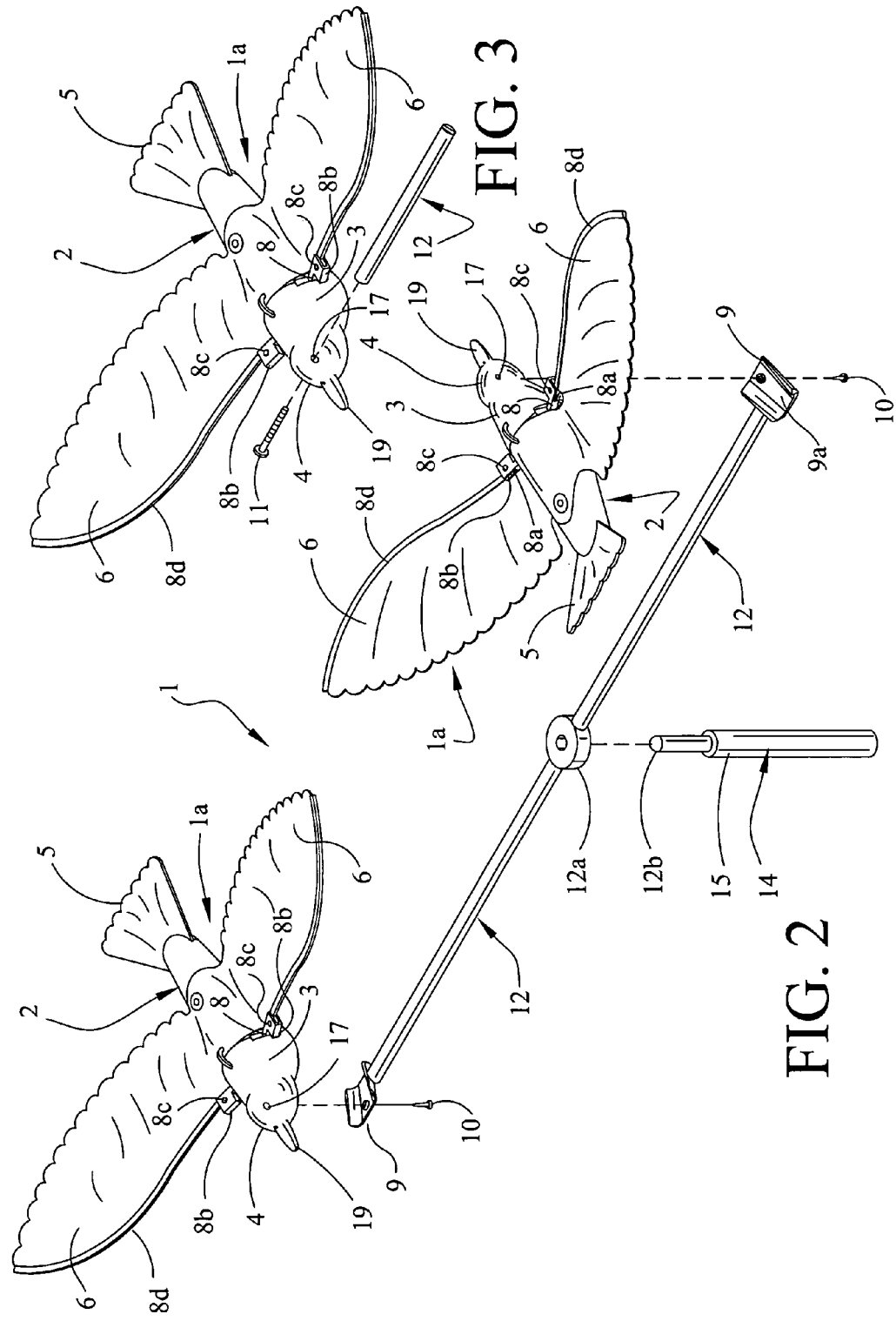

US 7,536,823 B2

FLYING BIRD DECOY AND METHOD

CROSS-REFERENCE TO RELATED APPLICATIONS

This application claims the benefit of and incorporates by reference prior filed copending U.S. Provisional Application Ser. No. 60/852,294, Filed Oct. 18, 2006.

SUMMARY OF THE INVENTION

This invention relates to decoys for use by hunters and photographers and more particularly, to a method of attracting wildlife such as coyotes, bobcats, foxes, wolves, bear, migratory birds and the like, using lightweight flying bird decoys that simulate migratory, forager, predatory or waterfowl birds. Two of the bird decoys in the flying bird decoy of this invention are typically supported on the ends of a rotatable arm mounted on a support to impart life-like movements to the bird decoys when one or both of each of the decoy wings flap in an up and down motion. In a first embodiment each bird decoy is configured in the shape of a dove, quail, crow, hawk, duck, goose or the like and is supported on one end of a support-mounted, rotatable rod or arm using a throat mount, with the lower end of the support typically inserted in the ground or in the bottom of a waterbody. In a second embodiment the bird decoys are mounted on the extending ends of one or more rotating rods or arms at the respective decoy heads to likewise facilitate a life-like, circular flying motion of the bird decoys in one or more levels of flight. A simulated injury, panic or distress is imparted to the bird decoys in a third embodiment of the invention by folding one wing of at least one of the decoys and operating the bird decoys to cause flapping of the extended wings and erratic, typically circular movement of the bird decoys on the rod or arm, about the support.

BRIEF DESCRIPTION OF THE DRAWINGS

The invention will be better understood by reference to the accompanying drawings, wherein:

FIG. 2 is a perspective, partially exploded view of the flying bird decoy illustrated in FIG. 1, illustrating the throat mounts for mounting the bird decoys;

FIG. 3 is a perspective view of one of the bird decoys mounted on one end of a rotatable rod or arm, illustrating an alternative bird decoy mounting technique;

DESCRIPTION OF THE PREFERRED EMBODIMENTS

Figure 1:
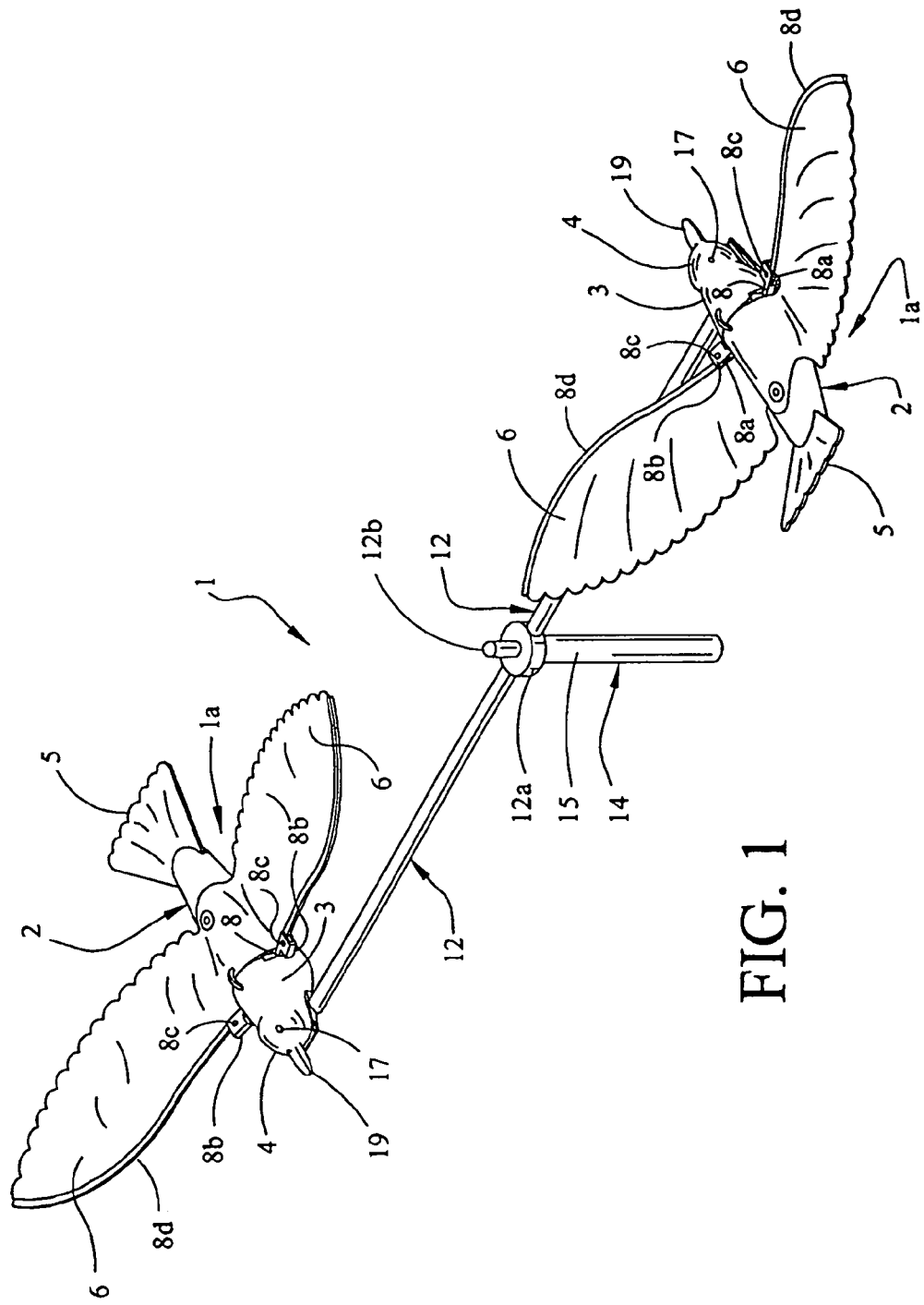
FIG. 1 is a perspective view of a preferred flying bird decoy embodiment of this invention, with a pair of the bird decoys mounted at the throat on a rotatable rod or arm rotatably attached to a pole or stake support, typically inserted in the ground.

Referring initially to FIGS. 1 and 2 of the drawings, a typical flying bird decoy is generally illustrated by reference numeral 1 and includes a pair of bird decoys 1a, each having a decoy body 2, which may be typically shaped and colored to simulate migratory and/or foraging birds such as dove, quail, crows or predators, and further including owls and hawks, and/or a waterfowl, such as duck or geese, in non-exclusive particular. A neck 3 extends from the decoy body 2 of each of the bird decoys 1a and is terminated by a head 4 and a beak 19, both shaped to resemble one of the above predator or waterfowl birds, as desired. Simulated tail feathers 5 also project from the opposite end of each decoy body 2 from the head 4, and the wing spars 8d of the respective extended wings 6 are typically attached to the corresponding decoy body 2 in the wing slots 8a of wing plates 8b, by wing pivot pins 8c, respectively, in a retractable manner wing pins 8 connect the corresponding wing plates 8b to a gear and motor mechanism (not illustrated). This mechanical arrangement is detailed in my U.S. Pat. No. 6,907,688 and allows the wings 6 to be extended in simulated flying configuration and flap up and down as indicated by the arrow, responsive to the operation of a small, battery-powered motor (not illustrated), located inside the decoy body 2 and geared to the wing pins 8. Each bird decoy 1a is of the flying design, as hereinafter described, or it may be designed such that one or more of the folded wings 7 flap up and down in a folded configuration as in the folded wing 7 illustrated in FIG. 4, to simulate distress in the bird decoys 1a. As further illustrated in FIGS. 1 and 2, a support 14 is typically provided with an arm pin 12b and an arm bearing 12a, provided on a rotatable arm 12, engages the arm pin 12b at the mount end 15 of the support pole 14. Accordingly, flapping of the extended wings 6 of the bird decoys 1a simulates a flying, take-off or landing sequence of the bird decoys 1a as they are fixed to the ends of the rotating arm 12, when the support 14 is extended into the ground 13 at the typically sharp end 16. Furthermore, the support 14 can be of any desired length and shape and may include a foot 14a, that facilitates insertion in the ground 13, or in the bottom of a waterbody, as illustrated in FIGS. 4 and 5.

Figure 4:
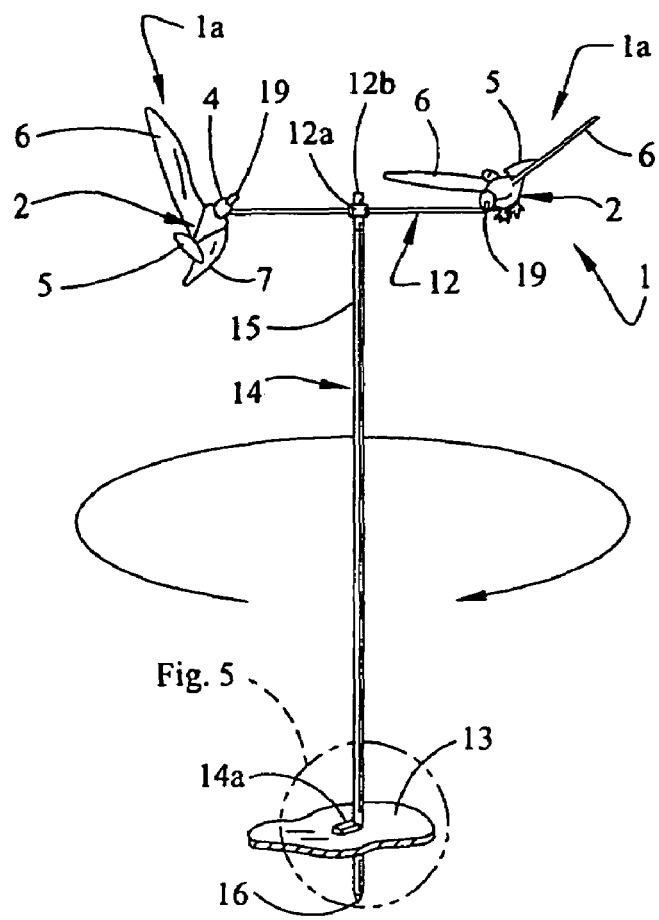
FIG. 4 is a perspective view of a typical flying bird decoy embodiment, with the bird decoys circular flying movement illustrated and one wing of one of the bird decoys deployed in folded configuration, as the bird decoys are supported by the rod or arm.
Figure 5:
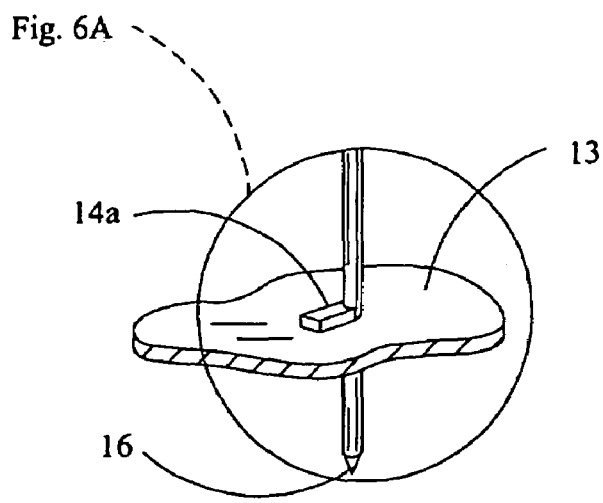
FIG. 5 is a perspective view of one end of the support illustrated in FIGS. 1-4, more particularly illustrating a foot provided on the support to aid in forcing the support into the ground.

Accordingly, referring now to FIGS. 1 and 4 of the drawings, the bird decoys 1a are designed to fly in a circle at a selected height above the ground on the rotatably-mounted arm 12, as indicated by the arrow in FIG. 4, as the extended wings 6 flap up and down, to simulate dove, quail, crows, hawks, owls, ducks or geese, in non-exclusive particular, as the case may require, and attract wildlife. In FIG. 4, the folded wing 7 of one of the bird decoys 1a accentuates a distress condition, due to vibration of the folded wing 7 and movement of the bird decoys 1a in an erratic manner around the support 14, as hereinafter further described.

Referring again to FIG. 2 of the drawings, in one preferred embodiment of the flying bird decoy 1, a pair of generally U-shaped throat mounts 9 are secured to the ends of the rotatable arm 12 and are also secured to the underside of the throat or neck 3 of the flying bird decoys 1, typically using a throat mount screw 10 extending through an opening in each throat mount 9. Each throat mount 9 defining a channel 9a that extends along a longitudinal axis which is generally transverse to a longitudinal axis of the rotating arm 12, the channel 9a being secured to the underside of the throat or neck 3 of the flying bird decoys 1. Alternatively, the ends of the rotatable arms 12 can be extended through openings provided in the respective heads 4 at the eyes 17 of the respective bird decoys 1a, typically using a head mount screw 11, to secure the flying bird decoys 1 on the rotatable arm 12 (FIG. 3).

Referring again to FIG. 4 of the drawings as described above, one of the extended wings 6 of one of the bird decoys 1a is retracted on the corresponding wing pin 8 to define a folded wing 7, in order to simulate a distressed or wounded bird. This simulation is enhanced by the up and down flapping movement of the extended wings 6 on both of the bird decoys 1a and the vibration of the folded wing 7. Accordingly, the bird decoys 1a illustrated in FIG. 2 can be designed to simulate the distressed movements of an injured dove, quail, crow, hawk, owl, duck, goose or the like, to attract wildlife of choice, as the bird decoys 1a move erratically, typically in a circle, vibrating on the rotating arm 12 and the support 14, as illustrated by the arrow in FIG. 4.

Figure 6:
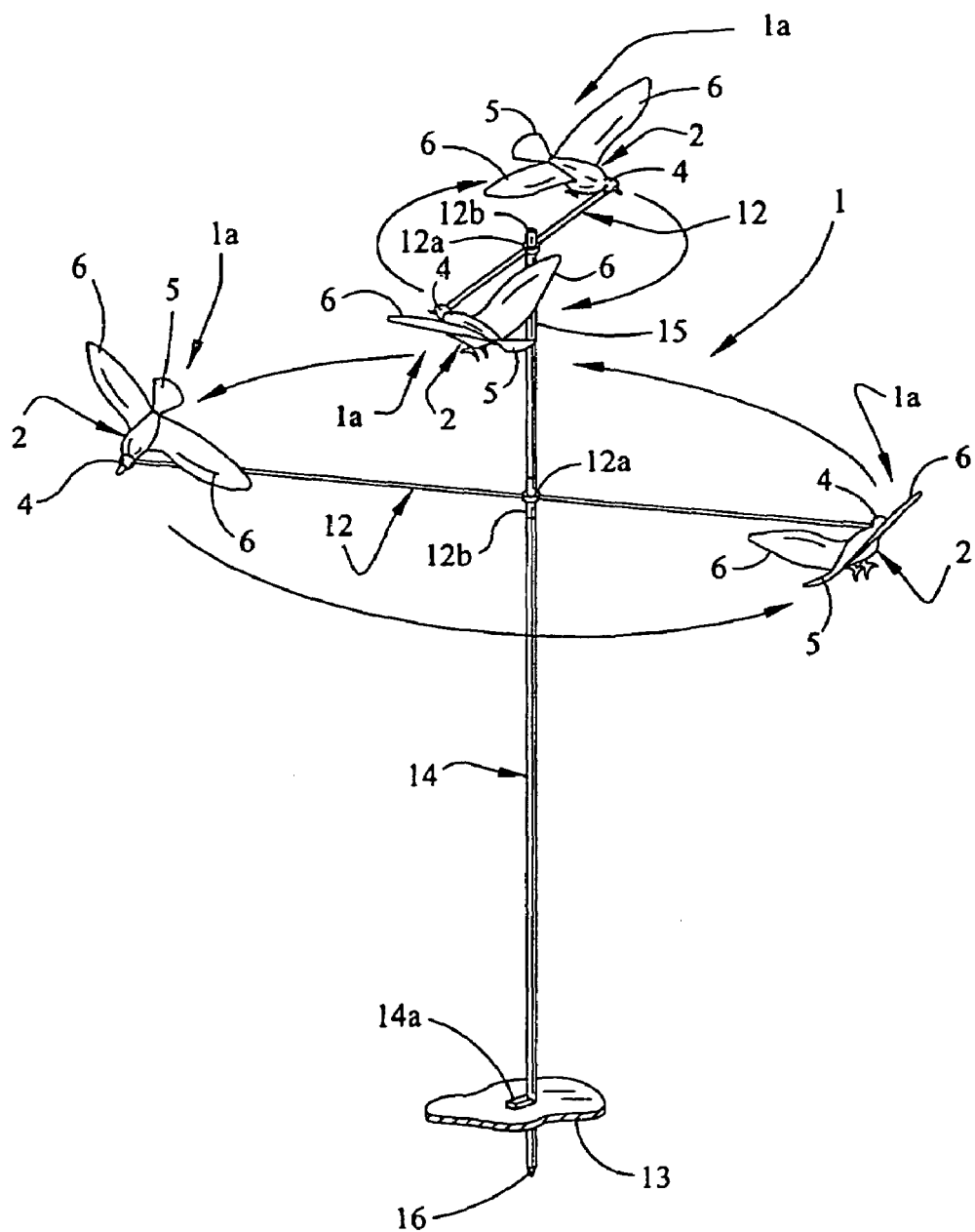
FIG. 6 is a perspective view of a multi-level or double tier embodiment of the flying bird decoy with bird decoys mounted on separate, vertically-spaced arms that rotate around a single support.

Referring now to FIG. 6 of the drawings, in another typical embodiment of the invention two levels of the bird decoys 1a of the flying bird decoy 1 are designed to simulate various birds described above and may be mounted on the spaced-apart, rotatable arms 12 on land or at or near the waterline of a waterbody by means of a common support 14, extending from a point of anchor on the bank or from a stump, limb, tree or other fixed object (not illustrated). As in the case of the single tier or level flying bird decoy 1 illustrated in FIG. 4, the flying bird decoy 1 illustrated in FIG. 6 can be positioned at or near a waterbody waterline, with the extended wings 6 of the respective bird decoys 1a moving up and down as indicated, to stir the waterbody at the water line and typically cause duck or geese simulation flying bird decoys 1 to slowly move in a circle, as indicated by the arrow in FIG. 6 and attract the attention of wildlife. Alternatively, one of the extended wings 6 in each or any of the bird decoys 1a can be retracted on the corresponding wing pin 8 to define a folded wing or wings 7 and further enhance the vibration and erratic movement of the flying bird decoys 1 at or near the water line of the waterbody for simulating a duck or goose in distress, typically with a broken or wounded wing, as illustrated in FIG. 4.

As further illustrated in FIG. 6, multiple tiers or levels of stacked bird decoys 1a can be deployed in stacked double-bird mounts of selected spacing, wherein the support 14 receives multiple rotatable arms 12 of selected length at the respective arm bearings 12a in any convenient, removable manner, typically at the two arm bearing pins 12b. A bushing can also be used in place of the respective arm bearings 12a, according to the knowledge of those skilled in the art.

It will be appreciated by those skilled in the art that the flying bird decoy 1 of this invention, in all of the embodiments illustrated in the drawings is designed to facilitate up and down flapping of the extended wings 6 of the respective bird decoys 1a in a true flying configuration, as well as vibration and simulated injured movement of a folded wing or wings 7 in distressed configuration (FIG. 4), to attract wildlife such as coyotes, bobcats, foxes, wolves, bears, migratory birds and the like. It will be further appreciated that the respective flying bird decoys 1a can be configured by injection-molding or other plastic shaping techniques, in appropriate colors according to the knowledge of those skilled in the art, to simulate migratory and/or foraging birds such as dove, quail and crows; predatory birds, including hawks and owls; and waterfowl, such as ducks and geese, in non-exclusive particular.

In use, the bird decoys 1a and support elements can be quickly and easily carried to the hunting site, wherein the bird decoys 1a have been previously attached to the rotatable arm(s) 12 or may be attached to the rotatable arm(s) 12 in the field, typically using the throat mount screws 10 (FIG. 2) or head mount screws 11 (FIG. 3). However, it will be understood that other body mounts such as breast mounts and the like (not illustrated) can be used, instead of the throat mounts 9. As heretofore described, the rotatable arm(s) 12 is easily connected to the support pole 14 at the arm bearing(s) 12a using the arm pin(s) 12b as illustrated in FIGS. 2, 4 and 6, for easy assembly in the field and a switch (not illustrated) on the decoy body 2 of each of the bird decoys 1a is then manipulated to energize an electric motor (not illustrated) inside the respective decoy bodies 2 and facilitate flapping of the extended wings 6 up and down. Alternatively, one extended wing 6 of both or either one of the bird decoys 1 can be folded to define a folded wing or wings 7 (FIG. 4) and facilitate vibration or alternative erratic, circular and simulated distressed movement of the bird decoys 1a about the support 14, in such a manner as to attract wildlife of choice. Vibration and erratic movement of the bird decoys 1a in a simulated injured or damaged condition in one or several levels, either over land or over a waterbody and in the latter case, typically at or near the waterline, can also be achieved, as described above. Accordingly, it will be appreciated that the bird decoys 1a of this invention can be used in simulated distressed, take-off and landing, as well as actual flying conditions, as desired, by the user.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A flying bird decoy for attracting wildlife, comprising: at least one rod or arm; at least one pair of flying bird decoys attached to said at least one rod or arm, said at least one pair of flying bird decoys having motor-driven flapping wings; a U-shaped throat mount provided on each end of said at least one rod or arm and wherein said throat mounts are secured to undersides of throats of said at least one pair of flying bird decoys, respectively, for securing said at least one pair of flying bird decoys to said at least one rod or arm, each of said U-shaped throat mounts defining a channel that extends along a longitudinal axis which is generally transverse to a longitudinal axis of said at least one rod or arm, said channels of said U-shaped throat mounts being secured to the respective undersides of the throats of said at least one pair of flying bird decoys; an upward-standing support rotatably receiving said rod or arm; and wherein said at least one pair of flying bird decoys being attached to said at least one rod or arm in oppositely disposed relationship with respect to each other for causing said at least one rod or arm to rotate on said support responsive to operation of said motor-driven flapping wings.

2. The flying bird decoy of claim 1 comprising at least one fastener engaging each of said throat mounts and a respective one of said at least one pair of flying bird decoys for removably securing said at least one pair of flying bird decoys to said throat mounts, respectively.

3. The flying bird decoy of claim 1 wherein said at least one pair of flying bird decoys are selected from the group comprising simulated foraging birds, predatory birds, and waterfowl.

4. The flying bird decoy of claim 1 wherein said at least one pair of flying bird decoys are simulated predatory birds, comprising hawks and owls.

5. The flying bird decoy of claim 1 wherein said at least one pair of flying bird decoys are simulated waterfowl, comprising ducks and geese.

6. A bird decoy for attracting predators and migrating birds comprising at least one pair of flying bird decoys having motor-driven flapping wings disposed in spaced-apart relationship with respect to each other; a rod or arm connecting said at least one pair of flying bird decoys; a generally U-shaped throat mount provided on each end of said rod or arm and wherein said throat mounts are secured to undersides of throats of said at least one pair of flying bird decoys, respectively, for securing said at least one pair of flying bird decoys to said rod or arm, each of said U-shaped throat mounts defining a channel extending along a longitudinal axis which is generally transverse to a longitudinal axis of said rod or arm, said channels of said U-shaped throat mounts being secured to the respective undersides of the throats of said at least one pair of flying bird decoys; and a support rotatably carrying said rod or arm wherein said at least one pair of flying bird decoys fly around said support on said rod or arm responsive to operation of said motor-driven flapping wings.

7. The bird decoy of claim 6 comprising at least one fastener engaging each of said throat mounts and a respective one of said at least one pair of flying bird decoys for removably securing said at least one pair of flying bird decoys to each of said throat mounts, respectively.

8. The bird decoy of claim 7 wherein said at least one pair of flying bird decoys are selected from the group comprising simulated foraging birds, predatory birds, waterfowl, hawks, and owls.

9. A method of attracting wildlife comprising the steps of:
   (a) providing a bird decoy comprising:
      at least one rod or arm;
      at least one pair of flying bird decoys attached to said at least one rod or arm, said at least one pair of flying bird decoys having motor-driven flapping wings that flap up and down in a flying configuration;
      a U-shaped throat mount provided on each end of said at least one rod or arm and wherein said throat mounts are secured to undersides of throats of said pair of flying bird decoys, respectively, for securing said at least one pair of flying bird decoys to said at least one rod or arm, each of said U-shaped throat mounts defining a channel extending along a longitudinal axis which is generally transverse to a longitudinal axis of said at least one rod or arm, said channels of said U-shaped throat mounts being secured to the respective undersides of the throats of said at least one pair of flying bird decoys;
      a support for rotatably receiving said rod or arm;
   (b) rotatably mounting said at least one pair of flying bird decoys on said support; and
   (c) causing the motor-driven wings of the at least one pair of flying bird decoys to flap up and down and fly the at least one pair of flying bird decoys around the support.

10. The method of claim 9 comprising the step of extending the support into the ground to a selected depth for locating the at least one pair of flying bird decoys a selected distance above the ground.

11. The method of claim 9 comprising the step of extending the support into a bottom of a waterbody to a selected depth for locating the at least one pair of flying bird decoys a selected distance from a surface of the waterbody.

12. The method according to claim 9 comprising the step of folding one of the motor-driven wings of at least one flying bird decoy of the at least one pair of flying bird decoys and extending the other one of the motor-driven wings of said at least one flying bird decoy of the at least one pair of flying bird decoys for altering said flying configuration and defining a simulated distress of the at least one pair of flying bird decoys.

13. The method of claim 12 comprising the step of extending the support into the ground to a selected depth for locating the at least one pair of flying bird decoys a selected distance above the ground.

14. The method of claim 12 comprising the step of extending the support into a bottom of a waterbody to a selected depth for locating the at least one pair of flying bird decoys a selected distance from a surface of the waterbody.

* * * * *